United States Patent [19]
Fukushima

[11] Patent Number: 5,769,195
[45] Date of Patent: Jun. 23, 1998

[54] LOCK-UP CLUTCH FOR A TORQUE CONVERTOR

[75] Inventor: Hirotaka Fukushima, Hirakata, Japan

[73] Assignee: Exedy Corporation, Osaka, Japan

[21] Appl. No.: 656,820

[22] Filed: Jun. 3, 1996

[30] Foreign Application Priority Data

| Jun. 9, 1995 | [JP] | Japan | ................................. 7-143194 |
| Jun. 9, 1995 | [JP] | Japan | ................................. 7-143195 |
| Aug. 29, 1995 | [JP] | Japan | ................................. 7-220122 |

[51] Int. Cl.⁶ .............................. F16D 3/12; F16H 45/02
[52] U.S. Cl. ................. 192/3.29; 192/203; 192/205; 464/64; 464/67
[58] Field of Search ................................ 192/3.29, 203, 192/205, 212; 464/67, 64

[56] References Cited

U.S. PATENT DOCUMENTS

| 4,987,980 | 1/1991 | Fujimoto | ............................. 464/64 X |
| 5,052,664 | 10/1991 | Lesher et al. | ........................ 464/67 X |
| 5,080,215 | 1/1992 | Forster et al. | ...................... 192/203 X |
| 5,105,680 | 4/1992 | Naudin . | |
| 5,105,681 | 4/1992 | Naudin et al. . | |
| 5,105,921 | 4/1992 | Fujimoto . | |
| 5,168,775 | 12/1992 | Naudin et al. . | |
| 5,218,884 | 6/1993 | Rohrle . | |
| 5,273,372 | 12/1993 | Friedmann et al. | ................. 192/205 X |
| 5,295,910 | 3/1994 | Friedmann | ............................ 464/67 X |
| 5,377,796 | 1/1995 | Friedmann et al. | ................... 192/3.29 |
| 5,385,222 | 1/1995 | Otto et al. | ............................. 192/3.29 |
| 5,590,750 | 1/1997 | Graton et al. | .......................... 192/3.29 |

FOREIGN PATENT DOCUMENTS

| 42 13 341 A1 | 11/1992 | Germany . |
| 43 33 562 A1 | 4/1994 | Germany . |
| 2255395 | 11/1992 | United Kingdom . |
| 2271411 | 4/1994 | United Kingdom . |
| 94/07058 | 3/1994 | WIPO . |

*Primary Examiner*—Rodney H. Bonck
*Attorney, Agent, or Firm*—Shinjyu An Intellectual Property Firm

[57] ABSTRACT

In a lock-up clutch for a torque convertor, the number of mechanical parts is reduced to thereby simplify the structure. The lock-up clutch used in the torque convertor is provided with a clutch portion composed of a piston member and an elastic coupling portion composed of an outer circumferential support member and arc springs. The arc springs extend in the circumferential direction. The outer circumferential support member integrally includes outer circumferential support portions for covering outer circumferences of the arc springs and circumferential direction support portions engages with both ends, in the circumferential direction, of the arc springs.

7 Claims, 6 Drawing Sheets

LOCK-UP CLUTCH FOR A TORQUE CONVERTOR

BACKGROUND OF THE INVENTION

A. Field of the Invention

The present invention relates to a lock-up clutch for a torque convertor, where the lock-up clutch mechanism includes a vibration dampening spring and a spring engaging member.

B. Description of the Related Art

Typically, a torque convertor is used to transmit a torque through a hydraulic fluid contained therein. The torque convertor includes an impeller fixed to a front cover on an input side, a turbine disposed to face the impeller and a stator interposed between an inner circumferential portion of the impeller and an inner circumferential portion of the turbine. The hydraulic fluid which flows from the impeller causes the turbine to rotate. A flow direction of the hydraulic fluid is changed by the stator as the hydraulic fluid is again returned back to the impeller.

Some torque convertors include a lock-up clutch for mechanically outputting the torque from the front cover of the torque convertor to the turbine or a turbine hub. For example, the lock-up clutch is provided with a piston member which is engageable with a friction surface of the front cover, a retaining member fixed to the piston member, a plurality of coil springs each spring having to engaging ends, one engaging end engaging the retaining member, and the other engaging end engaging an engagement member extending from the turbine or the turbine hub.

Some torque converters having a lock-up clutch employ elongated springs referred herein as arc springs. Arc springs are typically very long, each arc spring extending circumferentially in an arcuate shape in a load-free state, instead of the coil springs. The arc springs insure low rigidity with twist characteristics in a wide range for absorbing minute twist vibrations. Arc springs usually have the tendency to extend radially outwardly at central portions thereof when they are compressed. In order to prevent wear due to contact between the arc spring and adjacent portions of the torque convertor and lock-up clutch, an outer circumferential support member extending in the circumferential direction is typically provided around the outer circumference of each arc spring.

Additionally, the lock-up clutch may also be provided with a member for supporting the arc springs in the circumferential direction, the outer circumference support member for supporting the radially outward portions thereof or the like. As a result, the number of mechanical parts is increased and the structure becomes complicated. Also, when the number of the parts is increased, the mass weight of the lock-up clutch is increased as well and the response of the piston member deteriorates.

In the conventional lock-up clutch, since the piston member and the frictional coupling portions are provided on the outer circumferential side, arc springs having a small diameter have to be used. For this reason, the torque transmission capacity of the lock-up clutch will typically be small.

Also, in the conventional lock-up clutch, a driven member for transmitting the torque from the arc springs to the turbine hub is usually formed with a disc-like shape, the overall weight of the lock-up clutch is increased. As a result, the response of the piston member deteriorates.

SUMMARY OF THE INVENTION

One object of the present invention is to provide a lock-up clutch for a torque convertor where the number of mechanical parts is reduced and whose structure is simplified.

Another object of the present invention is to provide a lock-up clutch for a torque convertor having an increased torque transmission capacity.

Still another object of the present invention is to provide a lock-up clutch for a torque convertor having a reduced weight.

In accordance with one aspect of the present invention, a lock-up clutch is provided in a torque convertor. The torque converter has a front cover and a turbine. The lock-up clutch mechanism is disposed between the turbine and the front cover and is operative for selective mechanical engagement between the turbine and the front cover. The lock-up clutch mechanism includes a plurality of elongated coil springs having an arcuate shape in an unstressed state and the coil springs having an arcuate length of at least 80° measured within the torque converter front cover. The lock-up clutch mechanism also includes an outer circumferential support portion which covers an outer circumference of the coil springs, the outer circumferential support portion being formed integrally with a plurality of support members which are configured to cause the coil springs to be compressed in response to engagement of the lock-up clutch mechanism and in response to twist vibrations imposed upon the torque convertor.

Preferably, there are two sets of the elongated coil springs symmetrically disposed within the lock-up clutch mechanism, each set of the elongated coil springs having two concentric springs. Preferably, the elongated coil springs have an arcuate length of approximately 150° measured within the torque converter front cover.

Alternatively, there may be three sets of the elongated coil springs symmetrically disposed within the lock-up clutch mechanism, each set of the elongated coil springs having two concentric springs. Preferably, the elongated coil springs have an arcuate length of approximately 100° measured within the torque converter front cover.

In another aspect of the present invention, a torque converter is provided with a front cover, a turbine and a lock-up clutch mechanism for transmitting torque between the front cover and the turbine. The lock-up clutch mechanism includes a piston member selectively engageable with the front cover and at least one coil spring having an arcuate shape in an unstressed state, disposed adjacent to the piston member. The lock-up clutch mechanism also includes an outer circumferential support member fixed to the piston member, the outer circumferential support member formed integrally with an outer support member which covers an outer circumferences of the coil spring in a circumferential direction, the outer circumferential support member also formed integrally with circumferential direction support portions which support each opposing end of the coil spring. The lock-up clutch mechanism also includes an output member fixed to the turbine, the output member being formed with engaging portions are which, along with the circumferential direction support portions, are configured to compress the coil spring in response to relative rotary displacement between the piston member and the turbine.

Preferably, there are three sets of the elongated coil springs symmetrically disposed within the lock-up clutch mechanism, each set of the elongated coil springs comprising two concentric springs. Preferably, the elongated coil springs have an arcuate length of approximately 100° measured within the torque converter front cover.

In yet another aspect of the invention, a lock-up clutch is provided in a torque convertor having a front cover and a turbine. The lock-up clutch mechanism selectively transmits torque between the front cover and the turbine. The lock-up clutch mechanism includes an output disc member having a radially inward portion connected to the turbine and a pair of input disc members disposed on opposing axial sides of the output disc member, the pair of input disc configured to rotate relative to the turbine and move axially for clamping engagement with an outer circumferential portion of the output disc member. The lock-up clutch mechanism also includes a plurality of coil elastic members having an arcuate shape in an unstressed state, the coil elastic members being disposed on an outer circumferential side of the output disc member and supported at opposing circumferential ends by the pair of input disc members. The lock-up clutch mechanism also includes a support member connected to the front cover for supporting the opposing circumferential ends of the coil elastic members in the circumferential direction.

Preferably, there holes are formed in the output disc member to allow for fluid flow.

Preferably, friction surfaces are fixed on opposing faces of an outer circumferential portion of the output disc member.

Preferably, the support member is formed integrally with an outer circumferential support portion extending in the circumferential direction for supporting an outer circumference of the coil elastic member, fixture portions fixed to the front covers, and circumferential direction support portions for supporting opposite ends, in the circumferential direction, of the coil springs.

Preferably, the fixture portions are fixed to an impeller shell.

Preferably, there are two sets of the elongated coil springs symmetrically disposed within the lock-up clutch mechanism, each set of the elongated coil springs having two concentric springs. Preferably, the elongated coil springs have an arcuate length of approximately 150° measured within the torque converter front cover.

In another aspect of the present invention, a torque converter having a front cover and a turbine also includes a piston member disposed adjacent to the front cover for selective engagement therewith, a plurality of elongated coil springs having an arcuate shape in an unstressed state, the coil springs being disposed adjacent to an outer circumferential portion of the piston, each end of each of the coil springs being supported by the piston member, and a first support member fixed to a surface of an outer circumferential portion of the turbine, the first support member having contact portions for supporting each of the ends of the coil springs.

Preferably, a second support member is fixed to the front cover for supporting the ends of the coil springs.

Preferably, the second support member integrally includes an outer circumferential support portions for covering outer circumferences of the coil springs and support portions for supporting both ends, in the circumferential direction, of the coil springs.

According to one aspect of the invention, there is provided a lock-up clutch for mechanically transmitting a torque from an input member of a torque convertor to an output member thereof. The lock-up clutch is provided with a clutch portion and an elastic coupling portion. The clutch portion is used for transmitting the torque between the input member and the output member. The elastic coupling portion is disposed in series with the clutch portion, including a plurality of arc springs, and an outer circumferential support portion. The plurality arc springs extend in the circumferential direction. The outer circumferential support member integrally includes outer circumferential support portions for covering an outer circumference of the elastic members, and circumferential direction support portions for supporting both ends, in the circumferential direction, of each of the arc springs.

In the lock-up clutch, when the clutch portion is engaged, the torque of the input member is mechanically transmitted to the output member through the clutch portion and the elastic coupling portion. The shock or twist vibration upon the lock-up coupling is absorbed by the arc springs. At this time, although, upon the compression, the arc springs are liable to project radially outwardly and further the central portions of the arc springs move radially outwardly by the centrifugal force, the arc springs are well supported by the outer circumferential support portion of the support member.

Since the outer circumferential portion and the circumferential direction support members of the support member are formed integrally with each other, the number of the mechanical parts is reduced. As a result, the overall structure is simple and the mass weight is reduced.

According to another aspect of the invention, there is provided a lock-up clutch for mechanically transmitting a torque from an input side front cover of a torque convertor to an output member thereof. The lock-up clutch is provided with a piston member, a plurality of arc springs, an outer circumferential support member and an output member. The piston member detachably coupled with the front cover. The arc springs are disposed in the vicinity of the piston member, extending in the circumferential direction. An outer circumferential support member integrally includes an outer support member for covering outer circumferences of the arc springs, circumferential direction support portions for supporting both ends, in the circumferential direction, of the arc springs and fixture portions fixed to the piston member. An output portion fixed to the output member for supporting both ends, in the circumferential direction, of the arc springs.

In this lock-up clutch, when the piston member is coupled with the front cover, the torque of the front cover is transmitted through the piston member, the outer circumferential support member, the arc springs and the output member to the output side member. The shock or twist vibration is absorbed by the arc springs upon the lock-up coupling.

The outer circumferential support member integrally includes the outer circumferential portion and the circumferential direction support portions. Therefore, it is possible to reduce the number of the mechanical parts more than the conventional case.

According to another aspect of the invention, there is provided a lock-up clutch for mechanically transmitting a torque from an input member of a torque convertor to an output member thereof. The lock-up clutch includes an output disc member, a pair of input disc members, a plurality of arc springs and a support member. The output disc member has a radially inward portion connected to the output member. The pair of input disc members are disposed on both sides of the output disc member and moving in an axial direction for clamping an outer circumferential portion of the output disc member. The plurality of arc springs are disposed on an outer circumferential side of the output disc member and supported at both ends in the circumferential ends of the pair of input disc members. The support member is connected to the input members for supporting both ends, in the circumferential direction, of the plurality of arc springs.

In the lock-up clutch of the torque convertor, for example, the pair of input disc members are moved in the axial direction and an outer circumferential portion of the output disc member is clamped by the operation of the hydraulic fluid. Then, the torque of the input member is transmitted to the output side member through the support member, the plurality of arc springs, the pair of input disc member and the output disc member.

Since the outer circumferential portion of the output disc member, i.e., the frictional coupling portions are disposed inside by the plurality of arc springs, it is possible to keep a large space on the outer circumferential side. As a result, it is possible to use arc springs having a large diameter. The torque transmission capacitance is increased.

According to still another aspect of the invention, there is provided a lock-up clutch for mechanically transmitting a torque from an input side front cover of a torque convertor to a turbine thereof. The lock-up clutch includes a piston member, arc springs and a first support member. The piston member disposed in the vicinity of the front cover for frictionally engaging therewith. The arc springs are disposed on an outer circumferential portion of the piston, supported at both ends to the piston member, and extending in an arcuate shape in a non-load condition. The first support member is fixed to a back surface of the outer circumferential portion of the turbine for supporting both ends of the arc springs.

When the piston member is fictionally coupled with the front cover, the torque from the input side member is mechanically transmitted to the turbine through the arc springs and the first support member. The shock or twist vibration is absorbed by the arc springs upon the lock-up coupling. Since the first support member is fixed to the back face of the outer circumferential portion of the turbine, the weight may be reduced.

These and other objects and the advantages of the present invention will become more apparent by reading the following explanations with reference to the accompanying drawings.

DESCRIPTION OF THE PREFERRED EMBODIMENTS

FIRST EMBODIMENT

Figure 1:
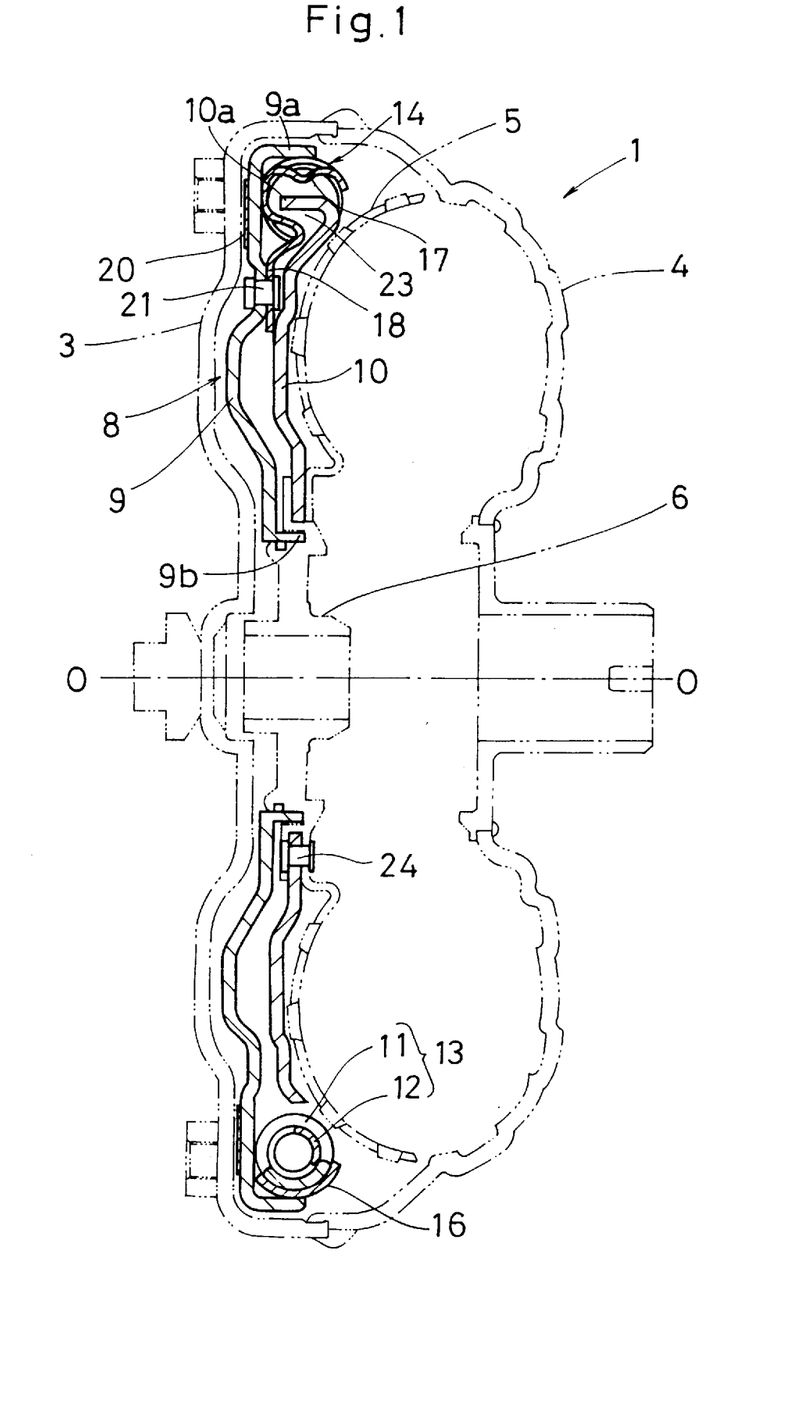
FIG. 1 is a schematic fragmentary longitudinal sectional view showing a torque convertor according to a first embodiment of the present invention.

A torque convertor 1 shown in FIG. 1 includes a torque convertor body portion formed with a front cover 3, an impeller 4, a turbine 5 and a stator (not shown) and a lock-up clutch 8. The shells of the front cover 3 and the impeller 4 form a hydraulic fluid chamber which is filled with the hydraulic fluid. There are various structures and configurations typically associated with the impeller 4, the turbine 5 and the stator (not shown) which are well known and applicable to the present invention, therefore, detailed explanation will be omitted.

In the present invention, as is shown in FIG. 1, an inner circumferential portion of the turbine 5 is fixed to a turbine hub 6 by rivets 24. The turbine hub 6 is spline-engaged with a shaft (not shown) extending from the transmission.

The lock-up clutch 8 includes a piston member 9, an output disc member 10, three arc springs 13 and a support member 14. Each of the arc springs 13 includes a large springs 11 and small springs 12. The three arc springs 13 are partially shown in FIG. 2. The three arc springs 13 are equidistantly spaced apart from one another in the circumferential direction.

The piston member 9 has a disc-like shape and is formed with an outer circumferential sleeve portion 9a and an inner circumferential sleeve portion 9b. The outer circumferential portion 9a and the inner circumferential portion 9b extend toward the transmission side (right side in FIG. 1) of the torque convertor 1. The inner circumferential sleeve portion 9b is supported on the outer circumferential surface of the turbine hub 6 but is rotatable with respect to the turbine hub 6 and is movable in the axial direction toward the front cover 3 for engagement and disengagement with the front cover 3. An annular frictional facing 20 is fixed on an axial face of the piston member 9 at a position facing a frictional face of the front cover 3.

Figure 2:
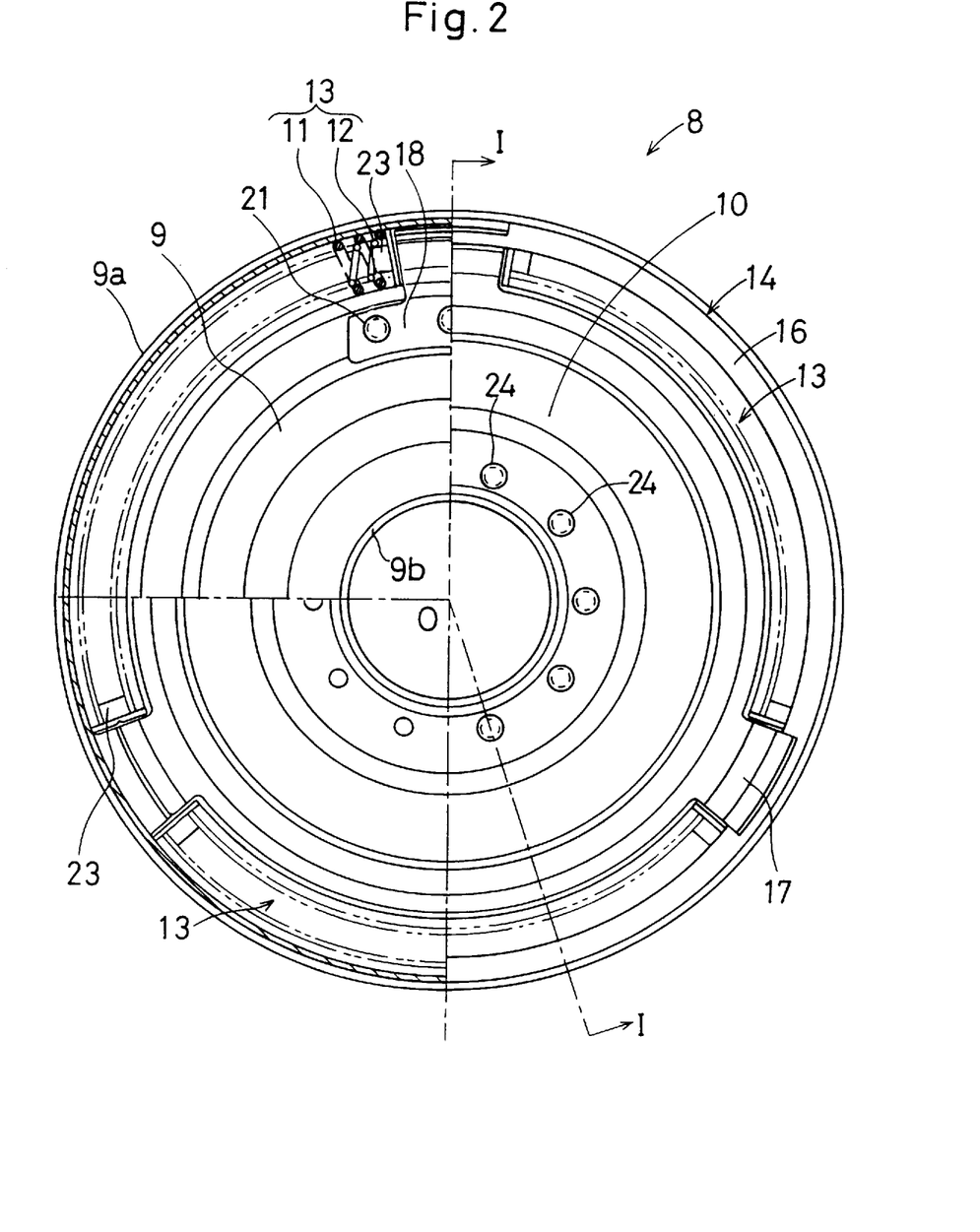
FIG. 2 is a part section, part elevational view of the lock-up clutch depicted in FIG. 1, in accordance with the first embodiment of the present invention.

A support member 14 is disposed on the inner circumferential side of the outer circumferential sleeve portion 9a of the piston member 9. The support member 14 is composed mainly of an outer circumferential support portion 16 having an arcuate cross section. The outer circumferential side of the outer circumferential support portion 16 is in contact with an inner circumferential surface of the outer circumferential sleeve portion 9a. The outer circumferential support portion 16 is formed with circumferential direction support portions 17 bent to extend toward an inner circumferential side of the outer circumferential support portion 16 and also extending toward the transmission side are formed at equidistantly spaced apart intervals at three positions in the circumferential direction of the outer circumferential support portion 16. Furthermore, fixture portions 18 extend radially inwardly from the circumferential direction support portions 17. As shown in FIG. 2, the fixture portions 18 extend in the circumferential direction at a predetermined angle and are fixed to the piston member 9 by rivets 21.

Each of arc springs 13 extends through an arc length of about 100° in the circumferential direction. Spring seats 23 are disposed at both ends of each arc spring 13. The spring seats 23 are in contact with the circumferential direction support portions 17 of the support member 14.

The output disc member 10 is fixed at the radially inward edge to the turbine hub 6 by the above-described rivets 24. Bent support portions 10a are formed at an equal interval in the circumferential direction at three positions on the outer circumferential portion of the output disc member 10 generally corresponding to the positions of the circumferential direction support portions 17 of the support member 14. Each of the bent support portions 10a extends toward the engine side (left side in FIG. 1) and is engageable with the adjacent spring seats 23 of the arc springs 13. Thus, the output disc member 10 is detachable in the axial direction relative to the arc springs 13 and the support member 14. This makes it simple to assemble the components.

When the hydraulic fluid pressure between the front cover 3 and the piston member 9 is reduced, the piston member 9 moves toward the front cover 3 and the frictional facing 20 comes into contact with the frictional surface of the front cover 3. When so engaged, the torque applied to the front cover 3 is transmitted through the piston member 9 to the turbine hub 6 through the support member 14, the arc springs 13 and the output disc member 10. The torque is outputted from the turbine hub 6 to a transmission shaft (not shown) extending from the transmission.

When a twist vibration is inputted to the front cover 3, the piston member 9 and the output disc member 10 rotate relative to each other, or in other words undergo relative rotary displacement. At this time, the arc springs 13 are repeatedly compressed in the circumferential direction. In this case, since the arc springs 13 have a wide twist angle range, they can effectively absorb the minute twist vibrations due to the low rigidity/wide twist angle characteristics. Upon the compression, the arc springs 13 have a tendency to extend radially outwardly and further, are urged radially outwardly by centrifugal force created by the rotation of the torque convertor 1. However, the arc springs 13 are well supported by the outer circumferential support portion 16 of the support member 14.

In this embodiment, since the outer circumferential portion 16 and the circumferential direction support members 17 of the support member 14 are formed integrally with each other, the number of the mechanical parts is reduced. As a result, the overall structure is simple and the mass weight is reduced.

Alternatively, differing numbers of springs may be used other than the configuration of three arc springs described above. For instance, two or four or more arc springs may be used. However, regardless of the number of arc springs, it is desirable, but not a strict requirement, for each arc spring to have an arc length of at least 90° or greater when measured with respect to the circumference of the torque convertor front cover and impeller.

Further, another alternative modification to the above described embodiment may be instead of supporting the overall circumference of each arc spring by the outer circumferential portion of the support member, it is possible to support only a part, for example, an intermediate portion of each spring in the circumferential direction.

As well, the support portions of the output disc member may be non-detachably engaged with the arc springs or the support member in the axial direction. In this case, the inner circumferential portion of the output disc member is spline-engagement with the turbine hub.

SECOND EMBODIMENT

Figure 3:
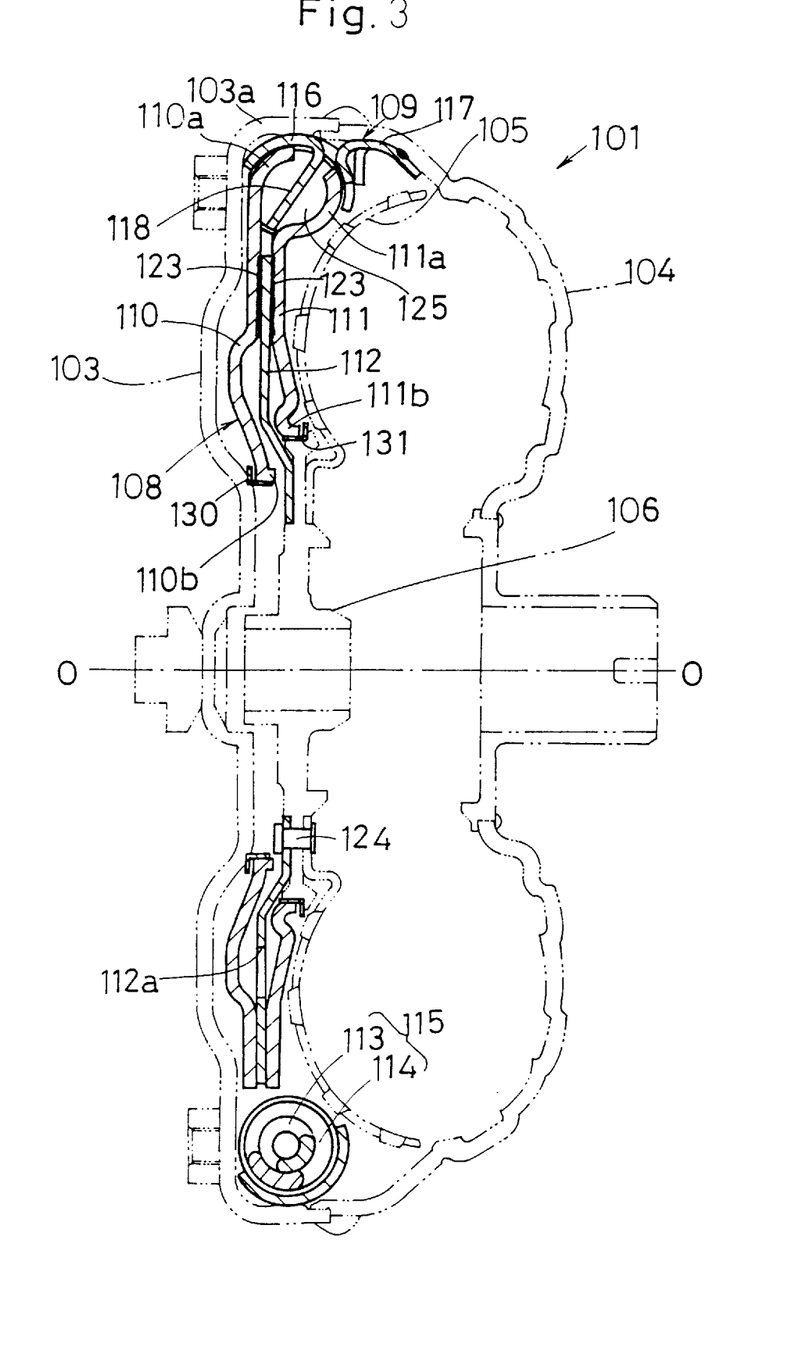
FIG. 3 is a schematic fragmentary longitudinal sectional view showing a torque convertor according to a second embodiment of the present invention having a support member.
Figure 4:
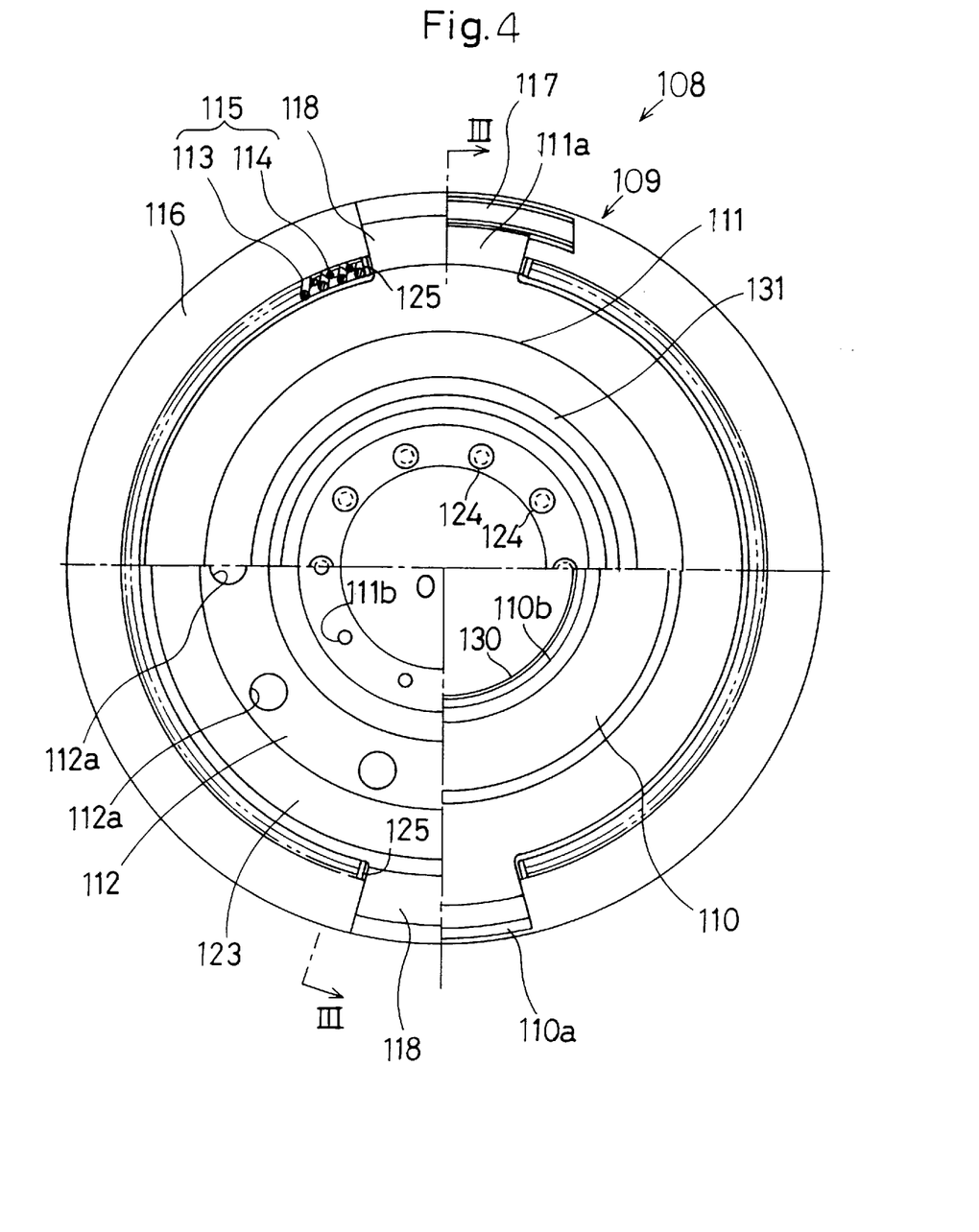
FIG. 4 is a part section, part elevational view of the lock-up clutch depicted in FIG. 3, in accordance with the second embodiment of the present invention, where the sectional view depicted in FIG. 3 is taken along the line III—III in FIG. 4, looking in the direction of the arrows.
Figure 5:
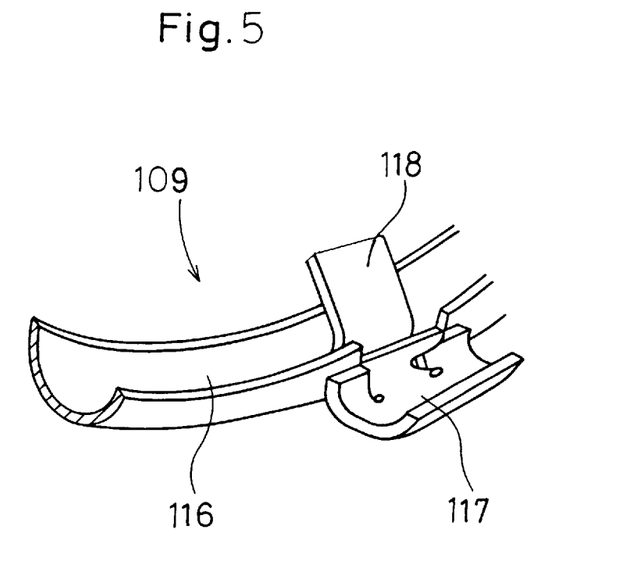
FIG. 5 is a partial perspective view showing the support member of the torque convertor depicted in FIGS. 3 and 4.

A second embodiment of the present invention is shown in FIGS. 3, 4 and 5. In the second embodiment, a lock-up clutch 108, shown in FIGS. 3 and 4, is disposed in a space defined between the front cover 103 and the turbine 105. The lock-up clutch 108 includes a support member 109, a pair of input disc members 110 and 111, an output disc member 112 and two arc springs 115 each composed of a large spring 113 and a small spring 114.

As best shown in FIG. 5, the support member 109 integrally includes an outer circumferential support portion 116 formed into an annular shape with a curved cross section, two fixture portions 117 bent at two diametrically opposite positions in the outer circumferential support portion 116, and circumferential direction support portions 118 bent radially inwardly from the outer circumferential support portion 116 at positions corresponding to the fixture portions 117. The fixture portions 117 are fixed to the shell of the impeller 104 by welding. The outer circumferential support portion 116 is disposed in contact with the inner circumference of an outer circumferential sleeve portion 103a of the front cover 103.

The arc springs 115 are formed into arcuate shape in an unstressed condition. In this example, each of the arc springs 115 has an arc length about the circumference of the torque convertor 1 of about 150° degree. The arc springs 115 are disposed on the inner circumferential side of the outer circumferential support portion 116. Spring seats 125 are disposed at each end of each arc spring 115 in the circumferential direction. The spring seats 125 are in contact with the circumferential direction support portions 118.

The pair of input disc members 110 and 111 have support portions 110a and 111a projecting radially outwardly at positions corresponding to the circumferential direction support portions 118 on the outer circumferential side. The support portions 110a and 111a are in contact with the spring seats 125 of the arc springs 115. The input disc members 110 and 111 are both configured to freely move in the axial direction between the front cover 103 and the impeller 104 with respect to the hub 106 and maintain contact with the arc springs 115.

An annular support member 130 is fixed to the front cover 103 and supports the inner circumferential portion of the input disc member 110. The support member 130 supports the inner circumferential edge of the input disc member 110 to be movable in the circumferential direction and the axial direction. Also, the support member 130 limits the movement of the inner circumferential edge of the input disc member 110 between the front cover 103 and the turbine hub 106. Furthermore, a support member 131 is fixed to an outer circumferential portion of the turbine hub 106. The support member 131 supports the inner circumferential edge of the input disc member 111 such that the input disc member 111 is movable in the circumferential direction and axial direction. Also, the support member 131 limits the movement of the input disc member 111 between the front cover 103 and the turbine 105.

The output disc member 112 is interposed in the axial direction between the pair of input disc members 110 and 111. The inner circumferential edge of the output disc member 112 is fixed to the turbine hub 106 by the rivets 124. A plurality of round holes 112a are formed equidistantly in the circumferential direction in a radially intermediate portion of the output disc member 112, as is shown in FIG. 4. An outer diameter of the output disc member 112 is less than an inner diameter of the support portions 110a and 111a of the input disc members 110 and 111, as is shown in FIG. 3. Friction surfaces 123 are provided in the lock up clutch 108, one friction surface 123 is fixed to each side of the output disc member 112 near an outer circumferential edge thereof.

The space defined between the pair of input disc members 110 and 111 is filled with the hydraulic fluid, the hydraulic fluid being able to flow through a gap between the input disc plate 110 and the output disc member 112 into the shaft (not shown) of the transmission. The inner circumferential portion of the space is sealed by the support members 130 and 131.

In operation, when the hydraulic fluid pressure between the input disc member 110 and the output disc member 112 is lowered, the hydraulic fluid in the space between the output disc member 112 and the input disc member 111 is drained through the round holes 112a of the output disc member 112. Then, both input disc members 110 and 111 are moved close to each other due to the fluid pressure within the remaining portions of the torque converter 101 and in response to movement of the output disc member 112 and the input disc member 111, the output disc member 112 and the input disc member 111 contact and engage the fiction surfaces 123 of the output disc member 112. Thus, the torque of the impeller 104 is transmitted from the support member 109, the arc springs 115 and the pair of input disc members 110 and 111 to the output disc member 112 and further outputted to the turbine hub 106 and subsequently to the transmission shaft (not shown).

When a twist vibration is inputted to the front cover 103, the support member 109 and the input disc members 110 and 111 are rotated relative to each other. At this time, the arc springs 115 are compressed in the circumferential directions. Since the arc springs 115 have a wide twist angle range, they can effectively absorb the minute twist vibrations due to the low rigidity/wide twist angle characteristics. Upon the compression, the arc springs 115 have a tendency to extend radially outwardly and are also urged radially outward by the centrifugal force of the rotating torque convertor 101. However, the arc springs 115 are supported by the outer circumferential support portion 116 of the support member 109 to restrain radially outward movement.

In the second embodiment, it should be noted that the plurality of frictional coupling faces are formed in the lock-up clutch 108. As a result, there is a corresponding increase the torque transmission capacity of the torque convertor when the lock-up clutch is engaged. Furthermore, since the diameter of the coil of the arc springs 115 is relatively large, the torque transmission capacity is increased. The coil diameter of the arc springs 115 are relatively large because the frictional surfaces of the lock-up clutch 108 are disposed at a position further radially inward than in prior art configurations, thus providing more room for an increased diameter spring.

Since the support member 109 integrally includes the outer circumferential support portion 116 for supporting the outer circumference of the arc springs 115 and the circumferential direction two end support portions 118 for supporting both ends in the circumferential ends of the arc springs 115, the number of mechanical parts is decreased to thereby simplify the structure.

In the second embodiment, two sets of arc springs 115 are described. However, alternatively, number of the arc springs 115 may be three or more.

Also, instead of supporting the overall circumference of each arc spring by the outer circumferential portion of the support member, it is possible to support only a part, for example, an intermediate portion of each spring in the circumferential direction.

THIRD EMBODIMENT

Figure 6:
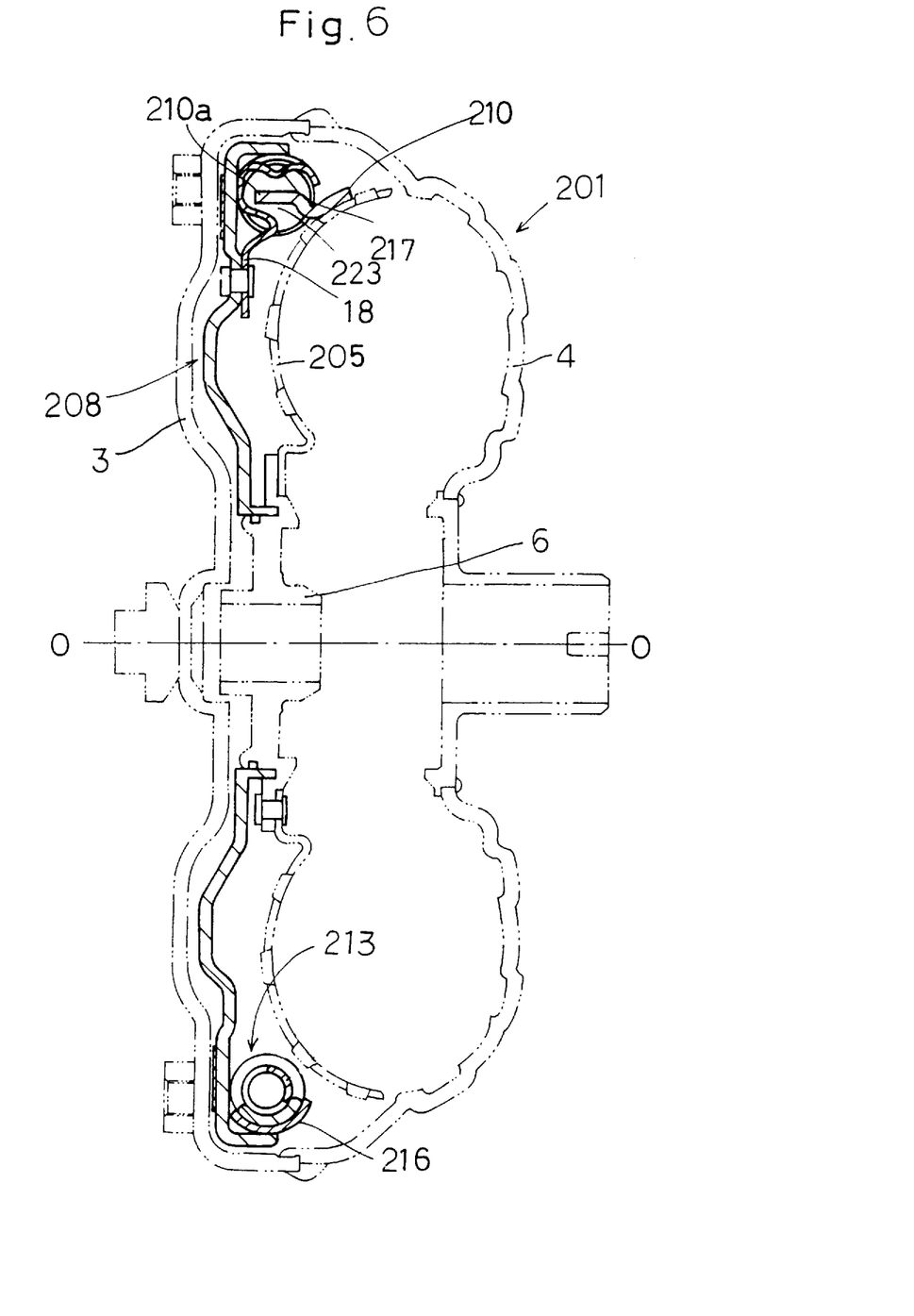
FIG. 6 is a schematic fragmentary longitudinal sectional view showing a torque convertor according to a third embodiment of the present invention.

In a third embodiment shown in FIG. 6, a lock-up clutch 208 has a many structure features that are similar or the same as that described above with respect to the lock-up clutch 8 of the first embodiment. For instance, the torque convertor 201 in accordance with the third embodiment includes the impeller 4, a turbine 205 and a hub 6. The torque convertor 201 also includes a front cover 3.

A driven member 210 is in the form of an annular plate which is welded to an outer circumferential portion of the turbine 205. Three support portions 210a project from the driven member 210 and extend toward the engine (on the left side in FIG. 6). The support portions 210a are extend between adjacent spring seats 223 of the arc springs 213. Thus, the driven member 210 is detachable in the axial direction from the arc springs 213 or the support member 214. It is therefore easy to assemble the components.

Several advantage of the lock-up clutch 208 are as follows. Since the arc springs 213 and the turbine 205 are coupled with each other at a minimum distance, the overall structure is made compact and its weight may be reduced. Furthermore, since the support member 214 integrally includes the outer circumferential support portion 216 and the circumferential direction support portions 217, the number of the mechanical parts is reduced. As a result, the overall structure may be simplified and the weight may be reduced.

A method for fastening the driven member 210 to the turbine 205 is not limited to welding. Other alternative methods, such a riveting or the like, may also be employed.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What I claim:

1. A lock-up clutch for a torque convertor, comprising:
   a torque converter having a front cover and a turbine;
   a lock-up clutch mechanism for transmitting torque between said front cover and said turbine, said lock-up clutch mechanism having:
     an output disc member having a radially inward portion connected to said turbine;
     a pair of input disc members, at least a first said input disc members being engaged with said front cover for rotation therewith but configured for limited axial movement with respect to said front cover, said pair of input disc members being disposed on opposing axial sides of said output disc member, said pair of input disc configured to rotate relative to said turbine and said input disc members are configured to move axially toward one another for clamping engagement with an outer circumferential portion of said output disc member in response to changes of fluid pressure within a portion of said torque convertor;
     a plurality of coil elastic members having an arcuate shape in an unstressed state, said coil elastic members being disposed on an outer circumferential side of said output disc member and supported at opposing circumferential ends by said pair of input disc members; and
     a support member connected to said front cover for supporting said opposing circumferential ends of said coil elastic members in the circumferential direction.

2. The lock-up clutch according to claim 1, wherein holes are formed in said output disc member to allow for fluid flow.

3. The lock-up clutch according to claim 1, further comprising friction surfaces fixed on opposing faces of an outer circumferential portion of said output disc member.

4. The lock-up clutch according to claim 1, wherein said support member is formed integrally with:

an outer circumferential support portion extending in the circumferential direction for supporting an outer circumference of said coil elastic member, fixture portions fixed to said front cover, and circumferential direction support portions for supporting opposite ends, in the circumferential direction, of said coil springs.

5. The lock-up clutch according to claim 4, wherein said fixture portions are fixed to an impeller shell.

6. The lock-up clutch for a torque convertor as in claim 1, wherein there are two sets of said elongated coil springs symmetrically disposed within said lock-up clutch mechanism, each set of said elongated coil springs comprising two concentric springs.

7. The lock-up clutch for a torque convertor as in claim 6, wherein said elongated coil springs have an arcuate length of approximately 150° measured within said torque converter front cover.

* * * * *